United States Patent
Wilson

(10) Patent No.: US 7,215,647 B2
(45) Date of Patent: *May 8, 2007

(54) TELEPHONE CONFERENCING SYSTEMS

(75) Inventor: Jeffrey Wilson, Fareham (GB)

(73) Assignee: Intellprop Limited, Guernsey (GB)

( * ) Notice: Subject to any disclaimer, the term of this patent is extended or adjusted under 35 U.S.C. 154(b) by 1001 days.

This patent is subject to a terminal disclaimer.

(21) Appl. No.: 10/219,433

(22) Filed: Aug. 15, 2002

(65) Prior Publication Data

US 2002/0191550 A1 Dec. 19, 2002

Related U.S. Application Data

(63) Continuation of application No. 09/214,952, filed as application No. PCT/GB97/01665 on Jun. 20, 1997, now Pat. No. 6,463,038.

(30) Foreign Application Priority Data

Jul. 19, 1996 (GB) .................................. 9615210.3

(51) Int. Cl.
H04L 12/28 (2006.01)
H04M 3/42 (2006.01)

(52) U.S. Cl. .................. 370/261; 379/158; 379/202.01

(58) Field of Classification Search ...................... None
See application file for complete search history.

(56) References Cited

U.S. PATENT DOCUMENTS 4,475,189 A 10/1984 Herr et al.
4,577,065 A 3/1986 Frey et al.
4,635,251 A 1/1987 Stanley et al.
5,408,526 A 4/1995 McFarland et al.

(Continued)

FOREIGN PATENT DOCUMENTS

EP 0 604 046 A1 6/1994

(Continued)

OTHER PUBLICATIONS

IBM Technical Disclosure Bulletin, "Self-Service Teleconference Call Arrangement", vol. 38, No. 5, May 1995, p. 557.

(Continued)

*Primary Examiner*—Andrew C. Lee
(74) *Attorney, Agent, or Firm*—Renner, Otto, Boisselle & Sklar, LLP

(57) ABSTRACT

A telephone conferencing system includes a voice services equipment (VSE) allowing a number of telephone calls to be connected together to form a conferencing function. Parties wishing to set up a conference agree on one of their telephone numbers being designated as a "link number". The conference participants dial into the system and then each enters the link number. The system stores the link number in a link number store when the first caller calls in. The system also checks the caller's calling line identity (CLI) with the entered link number, and the conference will not be enabled unless there is a match; thus, the conference cannot be initiated until the link number participant has called in. Any other participant calling earlier can be put on "hold". A number of different conferences may be taking place simultaneously, and participants will be grouped together correctly in their conference in accordance with the entered link number.

11 Claims, 1 Drawing Sheet

U.S. PATENT DOCUMENTS

| | | |
|---|---|---|
| 5,414,750 A | 5/1995 | Bhagat et al. |
| 5,631,904 A | 5/1997 | Fitser et al. |
| 5,701,340 A | 12/1997 | Zwick |
| 5,719,928 A | 2/1998 | Pinnell et al. |
| 5,812,535 A | 9/1998 | Hallock et al. |
| 5,812,653 A | 9/1998 | Jodoin et al. |
| 5,844,973 A | 12/1998 | Venkatraman et al. |
| 5,903,629 A | 5/1999 | Campbell, IV et al. |
| 6,192,119 B1 | 2/2001 | Wilson |

FOREIGN PATENT DOCUMENTS

| | | |
|---|---|---|
| JP | 05 145645 A | 9/1993 |

OTHER PUBLICATIONS

Haszto E.D. et al., "Alliance Teleconferencing Services Boost Business Efficiency", AT&T Technology, vol. 3, No. 1, 1998, pp. 22-31.

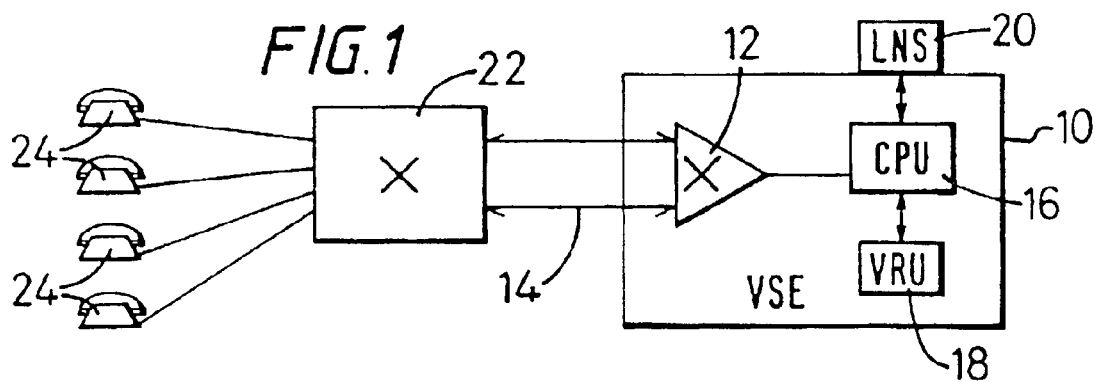
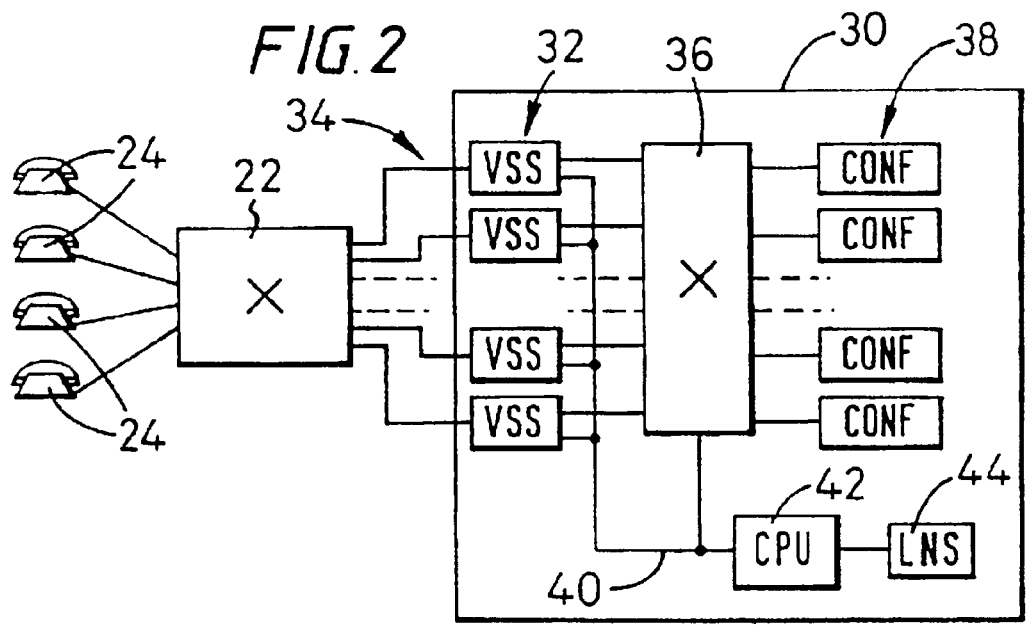
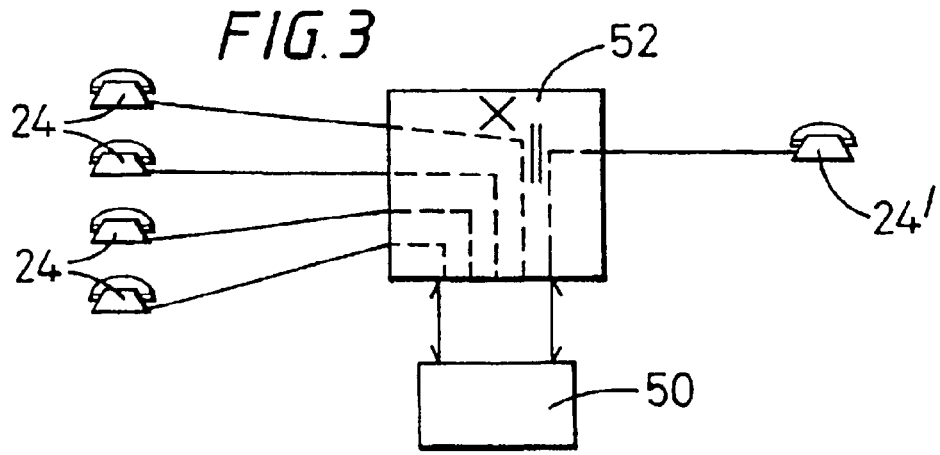

TELEPHONE CONFERENCING SYSTEMS

RELATED APPLICATION DATA

This application is a continuation of U.S. patent application Ser. No. 09/214,952, filed on Jan. 15, 1999, now U.S. Pat. No. 6,463,038 which is a 371 of International Application No. PCT/GB97/01665, filed on Jun. 20, 1997 and published in the English language.

This invention relates to telephone conferencing systems that enable a number of callers to participate in a conference by means of telephones.

BACKGROUND OF THE INVENTION

Telephone or audio conferencing allows three or more people to participate in a single telephone conversation. Each person is able to hear all the other callers when they speak and the conversation can progress as if all the callers were in the same room.

Audio telephone conferencing systems exist for connection to both the analogue and digital telecommunications networks. These systems use either analogue bridges or digital signal processing to combine the audio from three or more callers and play it to all participants in the conference.

With the advance of digital systems, more complex algorithms have been employed to improve the quality of the speech heard by each caller.

Existing conferencing systems have two basic market areas, business conferencing and social chatlines. Business conferencing can be provided as a public service by the network operator, or provided locally from a company's PABX. Chatlines are usually provided by independent service providers to callers who pay a premium rate for the call whilst accessing the service. The telephone numbers for chatlines are extensively advertised and there is no restriction on callers wishing to access the service, as long as the telephone being used has not been barred from initiating premium rate calls.

There are, at present, two main ways in which a telephone conference (teleconference) can be set up automatically. The first way is for all participants to dial in to a pre-arranged number at a pre-arranged time, on a so-called "meet me" basis. The second way is for one caller to dial into a system and then control the system so that it outdials to the other participants.

Business applications for "meet-me" teleconferencing systems can use an in-house system, a bureau or a network-based system. In each case, the business or group using a conference facility will generally have been allocated a telephone number and PIN. Telephone meetings can then be held on a scheduled or ad-hoc basis by all individuals with knowledge of the telephone number and PIN. The nature of the business user in terms of permanence and administrative simplicity make this approach practical and economic.

In contrast, a network operator wishing to provide "meet-me" telephone conferencing on an ad-hoc spontaneous basis to all subscribers would find the business model with its requirement for preregistration extremely difficult to manage effectively in the domestic arena.

Therefore the current situation is somewhat bizarre in that many public network operators (PNO's) provide on-demand meet-me conference facilities for strangers (i.e. chatline services) but do not provide such facilities for friends and families that may want to talk together.

SUMMARY OF THE INVENTION

According to the invention there is provided a telephone conferencing system comprising means for connecting a number of telephone calls together to provide a conferencing function, connection of a telephone call to the conference being allowed only upon receipt of an acceptable identification function, wherein the identification function is the telephone number of one of the participants designated as a link number, and wherein the conference is enabled only when the system recognises a match between the link number entered by the participant and the calling line identity signal of that call.

In a preferred embodiment of the invention, a system is provided which allows a number of groups of people to speak together on the telephone, the setting-up of the conferences being achieved automatically or semi-automatically, with provision for ensuring that callers are correctly grouped in their desired conferences.

The preferred system ensures that random callers cannot talk together on a chatline basis as the link number must match the telephone number of one of the callers. The system can also be configured such that the link number callers (i.e. the callers whose calling line identity matches the entered link number) must positively accept each of the other callers into the conference.

In accordance with the invention, it becomes possible to meet several key requirements for a network-based on-demand conferencing system.

All parties to the conference will generally pay their own costs.

Individuals are always routed to the correct conference even when many conferences are taking place simultaneously on the same system.

Conferences may be restricted only to those individuals that have been accepted by the link number caller.

The system is very simple to use, and this is a key issue if residential conferencing is to achieve widespread acceptance.

In the preferred system, any social group wishing to talk together will agree that one of their telephone numbers is to be designated the "link number". Since, in the preferred system, no caller will be placed in the conference until the telephone associated with this number dials into the system, there is no possibility of individuals arriving in the wrong conference (as all telephone numbers are, of course, different) unless they misdial or maliciously attempt to enter someone else's conference. In order to prevent such incorrect or malicious entry to a conference, the system can be configured such that all callers must be positively accepted by the link number caller, and this approach then provides a simple and secure conferencing system suitable for domestic or residential use.

BRIEF DESCRIPTION OF THE DRAWINGS

The invention will now be described by way of example with reference to the accompanying drawings, throughout which like parts are referred to by like references, and in which:

FIG. 1 is a schematic block diagram of a telephone conferencing system according to one embodiment of the invention;

FIG. 2 is a schematic block diagram of another embodiment of the invention; and

FIG. 3 is a schematic block diagram of a further embodiment of the invention to be used with an exchange capable of diverting calls.

Referring to FIG. 1, a telephone conferencing system comprises a voice services equipment (VSE) 10 having a telephone switch 12 receiving incoming/outgoing telephone lines 14 and being connected to a central processing unit (CPU) 16 of the VSE 10. The CPU 16 is connected to a voice resource unit (VRU) 18 and to a link number store (LNS) 20. The incoming/outgoing lines 14 are connected to a telephone exchange 22, such as a public switched telephone network (PSTN) exchange 22 to which telephones 24 have access.

The telephone switch 12 allows programmed switching between one or more selected lines and/or functions of the VSE 10, including the voice resource unit 18. The VSE 10 may, for example, be a Telsis Hi-Call, some aspects of which are described in International Patent Application Publication No. WO 92/22165.

In order to set up a teleconference, the participants agree to talk on a given day at a particular time. They also agree to one of the participants' telephone numbers being designated as a "master" or "link" number.

In one implementation of the system, the "link number" participant dials in to the system, for example by means of a short code such as "129", and then dials in the "link number", which is of course his own full national telephone number. If the CPU 16 identifies the calling line identity (CLI) as being identical to the link number, then the system accepts this as a valid conference request which enables the conference to proceed, assuming that system capacity is available for the desired conference. Also, the link number is stored in the link number store 20. Any other caller(s) currently on hold (see below) that have input the same link number will now be routed with the link number caller to a respective conferencing subsystem and the conference will start either immediately or after caller acceptance, as required.

Other callers may later join the conference, up to any defined configuration limit, in the same way by inputting the link number associated with an existing conference.

DETAILED DESCRIPTION

If a caller calls in before a conference has been established, the system may be set up for them to hear holding messages and/or music on hold.

In all cases, callers dial the service number (e.g. "129") and enter the agreed link number, and when a caller calls in whose CLI matches the entered link number, the system will establish a conference.

The link number store 20 is normally arranged to hold as many link numbers as there are ports on the system.

By matching the various link numbers prior to connecting the calls together, the system is capable of connecting different teleconferences even when different participants to different teleconferences arrive in overlapping sequences.

In order to avoid the need for the "link number" participant to call into the system first, an earlier non-link number participant can be given a message from the voice resource unit 18 to await the arrival of the link number participant, and then be provided with music or the like on hold. This can be achieved by the CPU 16 checking initially whether a current conference has been established with this link number. In the absence of such a match, the link number will be stored in the link number store 20 and the system can initiate the above-described "hold" routine. If such a non-link number participant does not wish to hold, he may simply hang up and ring back later.

FIG. 2 is a block diagram of a system set out in a different manner to that of FIG. 1, but providing similar facilities. Telephones 24 can be connected via the exchange 22 to a telephone conferencing system 30 which includes a number of voice signalling sub-systems (VSS) 32 for corresponding lines 34 from the exchange 22, a telephone switch 36 and conference units 38. A data bus 40 connects the voice sub-systems 32 and the telephone switch 36 to a CPU 42 itself connected to a link number store (LNS) 44.

An incoming call from a telephone 24 interacts with a voice sub-system 32 and it is established (as described above) by CLI checking whether the call is from the matching link number or not. If so, the conference is enabled (assuming that sufficient system capacity is available) and the link number is stored in the store 44 by the CPU 42. If the call is not from the matching link number, the number entered by the caller is checked against link numbers in the store 44. If a match is found, and the associated conference has already been enabled, the call Is allowed access by the telephone switch 36 to the corresponding conference unit 38. If there is no match, or if the conference has not already been enabled, the caller may be asked to wait by the voice sub-system 32, and optionally provided with music or the like on hold; also, the link number will be stored in the link number store 44 subject to any system configuration parameters.

FIG. 3 illustrates a system in which a conferencing system 50, which may be similar to that shown in FIG. 1 or FIG. 2, is associated with an exchange 52 providing call divert facilities. The "link number" caller calls from a telephone 24', again for example by dialling a short code such as "129", and interacts with the system 50 as described above for the FIG. 1 or FIG. 2 embodiments, such that the number of the telephone 24' is established in the system 50 as the link number of that conference. The exchange 52 is set up so that, when the line from the telephone 24' is known to be connected to the system 50 (for example, if the exchange has recorded that the number "129" has been dialled from the telephone 24') any calls reaching the exchange for the number of the telephone 24' will, instead of receiving an "engaged" or "busy" signal, be diverted to the system 50; in this case, since the "link number" is available to the exchange as the number dialled from the telephones 24, the calls can be connected directly to the conference. As this provides less call security than the system of FIGS. 1 and 2, since the other callers need only dial the telephone number of the "link number" participant, instead of the system number followed by the link number, suitable measures can be provided such as the system putting newly-arriving participants on hold and asking the "link number" participant and/or other existing conference participants whether the new call is to be allowed access to the conference or not. (This feature can also be provided on the systems of FIGS. 1 and 2.) Other security measures, which may be equally applicable to the systems of FIGS. 1 and 2 as well as that of FIG. 3, may involve the use of previously-agreed and entered PIN codes, whereby a new arrival to the conference must enter the correct PIN code prior to access to the conference.

Depending on the manner in which the systems of FIGS. 1 to 3 are set up, telephone conferences can be provided on a local or national basis. If local exchanges are provided with separate teleconferencing systems, then the conference originator may select a more appropriate exchange than his local exchange. For example, if all other (or most) participants are in a different area code, the originator could call that area code followed by "129" whereupon the telephone conference would be set up in that locality, and other participants would then be able to dial locally. Alternatively, the code "129" could be used nationally, and a centralised processing system set up for the complete country which would register all "129" calls and check for the appropriate exchanges, calls being forwarded to those exchanges as necessary.

In the above systems, depending on the manner of access to the teleconferencing systems, it will be apparent that at least some of the participants could call in on international calls from other countries.

Thus, embodiments of the invention provide flexible teleconferencing systems particularly suitable for social or small business use, in which individual participants can bear the costs of their own calls, which is generally a more acceptable basis of charging for such use than the conference originator bearing all charges.

The invention claimed is:

1. A telephone conferencing system comprising means for connecting a number of telephone calls together to provide a conferencing function, connection to a conference being enabled by a participant entering the telephone number of a selected one of the participants, wherein access to the system is enabled by means of a dialed service number, followed by entry of the telephone number of the selected one of the participants designated as a link number for that conference.

2. A telephone conferencing system according to claim 1, wherein the service number is a short code number.

3. A telephone conferencing system according to claim 1, operable to handle a plurality of conferences, wherein participants to the conferences are grouped by means of the entered link numbers.

4. A telephone conferencing system according to claim 1, comprising a link number store in which the link number is stored, a prospective participant being allowed access to an enabled conference only if the link number entered by the participant matches a stored link number associated with an enabled conference.

5. A telephone conferencing system according to claim 1, wherein the connecting means comprises a voice services equipment including telephone switching means operable to connect a number of telephone calls together.

6. A telephone conferencing system according to claim 1, wherein the conference is enabled only when the system recognizes a match between the link number entered by the participant and the calling line identity signal of that call.

7. A telephone conferencing system according to claim 6, wherein the connecting means responds to an entered link number and the caller's calling line identity signal and, in the event of these differing, checks whether the conference associated with that link number has been enabled, and if so, subject to system capacity, allows the caller access to the conference.

8. A telephone conferencing system according to claim 7, wherein, if the conference has not already been enabled, the system puts the caller, subject to system capacity, on "hold".

9. A telephone conferencing system according to claim 1, including a telephone exchange operable to record that a call from a specific telephone number is being made to a telephone conferencing unit, and to divert calls intended for that specific telephone number designated as the link number to the telephone conferencing unit thereby allowing access to the respective telephone conference.

10. A telephone conferencing system according to claim 1, wherein a PIN code must be entered by a participant in order to gain access to the conference.

11. A telephone conferencing system according to claim 1, wherein participants to a conference other than the link number participant must be positively accepted into the conference by the link number participant.

* * * * *